(12) United States Patent
Pierre

(10) Patent No.: US 12,290,999 B2
(45) Date of Patent: May 6, 2025

(54) MOLDING METHOD FOR TIRE PRODUCTION

(71) Applicant: The Goodyear Tire & Rubber Company, Akron, OH (US)

(72) Inventor: Christophe Jean Alexis Ghislain Pierre, Aubange (BE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 371 days.

(21) Appl. No.: 18/152,810

(22) Filed: Jan. 11, 2023

(65) Prior Publication Data

US 2024/0227335 A1 Jul. 11, 2024

(51) Int. Cl.
*B29D 30/06* (2006.01)
(52) U.S. Cl.
CPC .... *B29D 30/0629* (2013.01); *B29D 2030/063* (2013.01)
(58) Field of Classification Search
CPC .................. B29D 2030/063; B29D 30/0629
See application file for complete search history.

(56) References Cited

U.S. PATENT DOCUMENTS

| 3,779,677 | A | * | 12/1973 | Greenwood | ....... B29D 30/0629 |
| | | | | | 425/46 |
| 3,867,504 | A | * | 2/1975 | Greenwood | ....... B29D 30/0629 |
| | | | | | 264/315 |
| 4,573,894 | A | * | 3/1986 | Blayne | ................ B29C 33/0038 |
| | | | | | 425/39 |
| 4,595,553 | A | * | 6/1986 | Blayne | ................ B29C 33/0038 |
| | | | | | 264/501 |
| 4,957,676 | A | * | 9/1990 | Greenwood | ............ B29C 33/46 |
| | | | | | 264/102 |
| 5,585,064 | A | * | 12/1996 | Moris-Herbeuval | ... B29C 33/10 |
| | | | | | 264/501 |

(Continued)

FOREIGN PATENT DOCUMENTS

EP 2881230 A1 * 6/2015 ............. B29C 33/10

OTHER PUBLICATIONS

Extended European Search Report for Application No. 24150488.5, dated May 6, 2024.

*Primary Examiner* — John J DeRusso
*Assistant Examiner* — Alexander D Booth
(74) *Attorney, Agent, or Firm* — Katherine A. Smith

(57) ABSTRACT

A tire is molded in a mold having elements movable to bring the mold into an open or into a closed position. The mold includes first and second sidewall mold plates and tread mold segments capable of forming a mold cavity. The segments are radially. The process comprises: bringing the mold from an open position into a first intermediate position wherein the segments remain separated radially from the tire by a radial clearance; creating an axial clearance between the tire and the first or second sidewall mold plate so as to bring the mold into a second intermediate position; drawing a vacuum on the mold cavity while the mold is in the second position; bringing the mold from the second position into the first position by axially moving the first or second sidewall mold plate; and moving the segments radially inwardly and bringing the mold into the closed position.

20 Claims, 4 Drawing Sheets

(56) References Cited

U.S. PATENT DOCUMENTS

| | | | | |
|---|---|---|---|---|
| 5,614,225 | A | * | 3/1997 | Volpi .................... B29D 30/04 |
| | | | | 425/383 |
| 7,056,109 | B2 | * | 6/2006 | Kata ................ B29D 30/0629 |
| | | | | 425/46 |
| 2005/0112222 | A1 | | 5/2005 | Kata |
| 2020/0316888 | A1 | * | 10/2020 | Otani ................ B29D 30/0662 |

* cited by examiner

MOLDING METHOD FOR TIRE PRODUCTION

FIELD OF THE INVENTION

The present invention generally relates to a method for curing/producing an annular rubber structure, in particular to a molding method for tires. The present invention more specifically relates to facilitate drawing a vacuum on the mold cavity to produce pneumatic and non-pneumatic tires having an advanced visual appearance.

BACKGROUND OF THE INVENTION

Conventional, pneumatic tires have long been manufactured by vulcanization within a tire mold. For example, in U.S. Pat. No. 4,957,656 of Greenwood, a two-piece tire mold featuring various seals and pressurized compartments is disclosed. Further, in British patent GB 830,231 of Dunlop Rubber Co., Ltd. another two-piece tire mold utilizing a vacuum is disclosed.

Another form of tire mold is the segmented tire mold, as opposed to a two-piece tire mold. Examples of segmented tire molds include U.S. Pat. Nos. 3,779,677 and 3,867,504, both of Greenwood.

U.S. Pat. No. 3,779,677 discloses a tire mold in which tread mold segments are moved radially by a coned ring between sidewall plates which bear against the moving segments. Link means connecting each segment to the upper plate enable the segments to be retracted into the ring by moving the upper plate. The link means provides sufficient relative separation between the upper plate and the segments to prevent friction, wear, and binding therebetween during such retraction. The tire mold includes a pair of sidewall mold plates, each of which carries a tire sidewall molding surface. A plurality of tread mold segments collectively cooperate with the sidewall molding surfaces to form a closed tire mold cavity. The tread mold segments are mounted respectively on a plurality of carrier segments which are movable inwardly and outwardly with respect to the tire mold axis and particularly radially thereof. Each of the carrier segments is provided with an inclined surface, as well as guiding surfaces (e.g., a T-slot). The respective inclined surfaces cooperate with conjugately inclined surfaces carried by the closing ring and define collectively cones convergent on the mold axis outwardly, i.e., upwardly, of the upper platen. Radial movement of the respective segments inwardly, toward the axis, is effected by axial movement of the ring toward the lower sidewall plate. As the upper platen and ring move downwardly, engagement of the bottom surface of the segment with the flange surface of the lower sidewall plate prevents further axial movement of the segment, thereby converting the relative motion between the ring and the segment to radially inward movement of the segment. Similarly, axial movement of the ring upwardly relative to the segment, which is then being prevented from moving axially by the upper sidewall mold plate causes the segment to move radially outwardly.

U.S. Pat. No. 5,585,064 discloses a ventless segmented tire mold.

It is known to have an uncured tire (also called "green tire") placed into a tire mold to provide its radially outer surface with a specific tread design and cure it. Upon closure of the tire mold, the tire is cured at elevated temperature, wherein gases, such as, e.g., air, between the tire mold and the tire can be vented through small venting passages/channels in the tire mold. As a result of processes including such venting passages in the tire mold, so-called spews remain and protrude from the tire surface. It would be advantageous to improve the look of the tire by avoiding the presence of such spews. Different venting technologies relying on sophisticated small venting devices are known to avoid spews or make them smaller. However, each mold segment has to be provided with a large number of such venting devices or channels. This is, in particular, the case for winter tires because the tread blocks and their sipes require that all tiny elements of the tread be provided with a corresponding venting passage in the mold segments. It is expensive and time consuming to ensure venting in such a way. Venting devices may also be blocked which may result in quality problems and the need for intensive cleaning or maintenance.

Another known technology is to draw a vacuum on the tire mold before curing the tire with the idea that the air is removed before curing such that venting could be reduced to a minimum which could help to reduce costs significantly and improve the look of the tire. For example, EP2881230 describes such a tire mold and process. This document describes a system for providing a vacuum in a segmented tire mold, the system comprising a vacuum container and a segmented tire mold. The vacuum container seals the tire mold to make it airtight. The tire mold has an upper sidewall assembly and a lower sidewall assembly, a plurality of radially moveable tread mold segments operable with the upper sidewall assembly and the lower sidewall assembly to define a tire mold cavity in the closed position of the tire mold, a conical actuating ring assembly surrounding the tread mold segments for providing a radial movement of the tread mold segments into engagement with the upper sidewall assembly and the lower sidewall assembly. The vacuum container comprises a top-sealing means between the actuating ring assembly and the upper sidewall assembly, and a bottom sealing means between the actuating ring assembly and the lower sidewall assembly, such that the tire mold is airtight and ready for evacuation or evacuated only when fully closed. The top sealing means and the bottom sealing means comprise silicone. The tire mold and the vacuum container have no sliding seals.

U.S. Pat. Nos. 4,573,894 and 4,595,553 both describe a method and apparatus in which a tire mold is closed to within approximately one inch of full closure with a green tire in place therein for molding, and the tire mold is then evacuated employing a vacuum conduit before full mold closure whereby air within the mold cavity is evacuated and the necessity for vent holes in the tire mold is eliminated. The tire mold can be free of vent holes in the tread, sidewalls, and bead portions of the tire mold and includes, along the parting line, at least one vacuum conduit whereby the mold cavity may be evacuated to not more than 16932 Pa within not more than about 60 seconds employing a source of vacuum. Seals are provided radially outward of the vacuum conduit along the parting line, and, where necessary, adjacent to any moveable bead ring associated with the tire mold. Seals are, preferably, of a type wherein a differential between pressures experienced by one seal surface and obverse seal surface causes a more effective sealing arrangement.

A similar idea is found in U.S. Pat. No. 7,056,109 which describes a tire vulcanizing device that includes an upper plate and a lower plate which can be relatively displaced toward and away from each other, and a tire mold for vulcanizing and molding a tire arranged between the upper plate and the lower plate. The tire mold includes an upper and a lower side mold members arranged on the upper plate side and the lower plate side, respectively, and a plurality of sector mold members arranged between the upper and the lower side mold members. An outer ring for positioning the sector mold members in the radial direction is arranged on the lower plate side. An actuator means for opening the sector mold member is arranged on the lower plate, capable of vertical elevation.

SUMMARY OF THE INVENTION

A first aspect of the invention relates to a molding process wherein a tire is molded within a tire mold. The tire mold has movable elements that can be moved to bring the tire mold into an open or into a closed position. In the closed position, the tire mold defines a tire mold axis. The tire mold includes a first and a second sidewall mold plates and a plurality of tread mold segments cooperating with the sidewall mold plates to form a tire mold cavity. The tread mold segments are movable radially inwardly and outwardly with respect to the tire mold axis. The process comprises:
  arranging an uncured tire in the tire mold when the tire mold is in the open position;
  bringing the tire mold from the open position into a first intermediate, partially closed, position wherein the plurality of tread mold segments occupy a substantially final axial position but remain separated radially from the uncured tire by a radial clearance;
  creating an axial clearance between the uncured tire and at least one of the first and second sidewall mold plates so as to bring the tire mold into a second intermediate, partially closed, position;
  drawing a vacuum on the mold cavity while the tire mold is in the second intermediate position;
  bringing the tire mold from the second intermediate position into the first intermediate position by axially moving the at least one of the first and second sidewall mold plates; and
  moving the tread mold segments radially inwardly and bringing the tire mold into the closed position.

In the first intermediate position, the first and second sidewall mold plates may be in abutment with the uncured tire.

In the first and second intermediate positions of the tire mold, the mold cavity may be sealed in an airtight manner.

The axial clearance between the at least one of the first and second sidewall mold plates may be created by moving the at least one of the first and second sidewall mold plates with a pneumatic or hydraulic actuator.

The tread mold segments may be mounted slidingly to the first sidewall mold plate by respective retainer tees fixed to the tread mold segments and slidingly engaged in radial slots arranged on a first container plate carrying the first sidewall mold plate. The retainer tees and the slots may be dimensioned so as to allow for axial offset between the first sidewall plate and the tread mold segments.

The radial clearance in the first intermediate position of the tire mold may amount to between 3 and 12 mm.

The axial clearance in the second intermediate position of the tire mold may amount to between 3 and 12 mm.

According to an embodiment, the radial clearance in the first intermediate position of the tire mold amounts to between 5 and 10 mm and the axial clearance in the second intermediate position of the tire mold amounts to between 5 and 10 mm.

The tire mold may comprise first and second heating plates adjacent the first and second sidewall mold plates, respectively. The first and second heating plates may be a minimum distance apart from each other when the tire mold is in the closed position. The first and second heating plates may be spaced apart from each other further than the minimum distance when the tire mold is in the first and second intermediate positions. The axial clearance between the uncured tire and at least one of the first and second sidewall mold plates may be created by axially moving the first sidewall mold plate closer to or into abutment with the first heating plate.

The axial clearance may be created between the uncured tire and the first sidewall mold plate by axially moving the first sidewall mold plate. Additionally, the creation of the axial clearance may release axial constraint on the uncured tire such that the uncured tire at least partially detaches from the second sidewall mold plate and air (or ambient fluid) is allowed to be drawn from an interstice between the uncured tire and the second sidewall plate.

The molding process may comprise curing the tire when the mold is in the closed position.

In a further aspect, the invention relates to a method for closing a tire mold for curing rubber-based pneumatic or non-pneumatic tires, the tire mold comprising a first and a second sidewall mold plates and a plurality of tread mold segments cooperating with the sidewall mold plates to form a generally annular tire mold cavity, the tire mold cavity having a tire mold axis, and the tread mold segments being movable radially inwardly and outwardly with respect to the tire mold axis. The method may comprise:
  when the tire mold is in the open position, arranging an uncured tire in the tire mold;
  partially closing the tire mold by bringing the tire mold from the open position into a first intermediate, partially closed, position wherein the plurality of tread mold segments occupy a substantially final axial position while remaining radially separated from the uncured tire by a radial clearance of at least 3 mm;
  bringing the tire mold into a second intermediate, partially closed, position by creating an axial clearance of at least 3 mm between the uncured tire and at least one of the first and second sidewall mold plates;
  evacuating gases from the mold cavity by application of a vacuum when the tire mold is in the second intermediate position;
  while maintaining application of the vacuum, bringing the tire mold from the second intermediate position back into the first intermediate position; and
  bringing the tire mold into the closed position by moving the tread mold segments radially inwardly.

In the second intermediate position of the tire mold, the mold cavity may be sealed in a gastight manner.

In the first intermediate position of the tire mold, the first and second sidewall mold plates may axially constrain the uncured tire.

The axial clearance may be created between the uncured tire and the first sidewall mold plate by axially moving the first sidewall mold plate. The creation of the axial clearance may release axial constraint on the uncured tire such that the uncured tire may at least partially detach from the second sidewall mold plate and air may be allowed to be drawn from an interstice between the uncured tire and the second sidewall plate, by application of the vacuum.

The axial clearance between the at least one of the first and second sidewall mold plates may be created by moving the at least one of the first and second sidewall mold plates with a pneumatic or hydraulic actuator.

The tread mold segments may be mechanically coupled to an actuating ring so that the tread mold segments are constrained to move radially when the actuating ring is moved axially. The tire mold may be brought into the closed position by moving the actuating ring in an axial direction causing the tread mold segments to move radially inwardly.

The tread mold segments may be mounted slidingly to the first sidewall mold plate by respective retainer tees fixed to the tread mold segments and slidingly engaged in radial slots arranged on a first container plate supporting the first sidewall mold plate. The retainer tees and the slots may be dimensioned so as to allow for an axial clearance between the first sidewall plate and the tread mold segments sufficient for the tire mold to be brought into the second intermediate position.

The tire mold may comprise first and second heating plates adjacent the first and second sidewall mold plates, respectively. The first and second heating plates may be a minimum distance apart from each other when the tire mold is in the closed position. The first and second heating plates may be spaced apart from each other further than the minimum distance when the tire mold is in the first and second intermediate positions. The axial clearance between the uncured tire and at least one of the first and second sidewall mold plates may be created by axially moving the first sidewall mold plate closer to or into abutment with the first heating plate.

The radial clearance in the first intermediate position of the tire mold may amount to 12 mm or less and the axial clearance in the second intermediate position of the tire mold may amount to 12 mm or less.

Definitions

The expressions "axial" and "axially" are used herein to refer to lines or directions that are parallel to the axis of the tire mold.

The expressions "radial" and "radially" are used to mean the direction of a line intersecting the mold's axis at right angle.

The expression "azimuthal" refers to a direction that is perpendicular to both the radial and axial directions in the location under consideration. Instead of "azimuthal," the word "angular" may be used.

In the present document, the verb "to comprise" and the expression "to be comprised of" are used as open transitional phrases meaning "to include" or "to consist at least of." Unless otherwise implied by context, the use of singular word form is intended to encompass the plural, except when the cardinal number "one" is used: "one" herein means "exactly one." Ordinal numbers ("first," "second," etc.) are used herein to differentiate between different instances of an object of the same kind; no particular order, importance or hierarchy is intended to be implied by the use of these expressions. Furthermore, when plural instances of an object are referred to by ordinal numbers, this does not necessarily mean that no other instances of that object are present (unless this follows clearly from context). When reference is made to "an embodiment," "one embodiment," "embodiments," etc., this means that these embodiments may be combined with one another, across all aspects of the invention. Furthermore, the features of those embodiments can be used in the combination explicitly presented but also that the features can be combined across embodiments without departing from the invention, unless it follows from context that features cannot be combined.

BRIEF DESCRIPTION OF THE DRAWINGS

The invention will be described by way of example and with reference to the accompanying drawings in which.

DETAILED DESCRIPTION OF THE INVENTION

Figure 4:
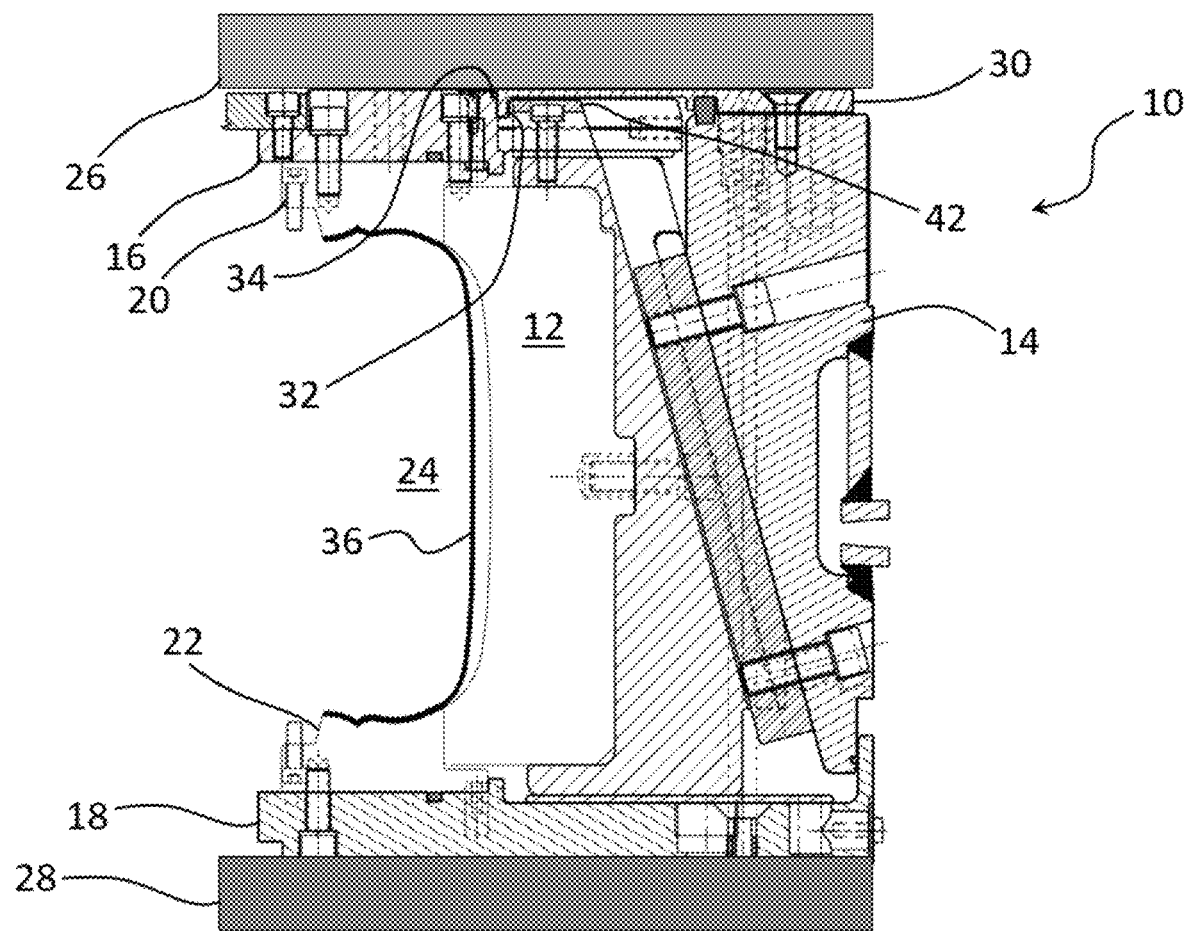
FIG. 4 is a schematic partial cross-sectional view of the tire mold in its completely closed position.

FIG. 4 shows a partial cross-sectional view of a tire mold 10 in its closed position. The tire mold 10 comprises tread mold segments 12 that may be moved radially by a coned actuating ring 14. The movement of each tread mold segment 12 is constrained to a radial translation between a first container plate 16 and a second container plate 18, which bear (at least indirectly) against the moving tread mold segments 12. The first and second container plates 16, 18 carry first and second annular sidewall mold plates 20, 22, respectively, which extend around the axis of the mold 10 (not shown). The first and a second sidewall mold plates 20, 22 and the plurality of tread mold segments 12 cooperate to form a tire mold cavity 24.

The actuating ring 14 may be pushed into the direction of the second container plate 18 by a first heating plate 26. The second container 18 is supported by a second heating plate 28. An intermediate ring 30 is fixed on the actuating ring 14 so as to be arranged between and the first container 26 and the actuating ring 14. The radially inward end of the intermediate ring 30 comprises a cylindrical flange 32, cooperating with an annular seal 34 on an opposed cylindrical face of the first container plate 16.

FIG. 4 further schematically shows a green (uncured) tire 36 arranged in the mold cavity 24.

A process according to an embodiment of the invention is now described with reference to FIGS. 1 to 4. An uncured tire 36 is arranged in the mold cavity 24 of the tire mold 10 when the tire mold 10 is in an open position (not shown). The tire mold 10 is then brought from the open position into a first intermediate, partially closed, position, illustrated in FIG. 1. In the first intermediate position, the tread mold segments 12 occupy a substantially final axial position but remain separated radially from the uncured tire 36 by a radial clearance 38 and from the first and second sidewall mold plates 20, 22 by respective cylindrical gaps 39A, 39B. During the transition from the open position to the first intermediate position of the mold, the first container plate 16 carrying the first sidewall mold plate 20 is brought into a position parallel to the second container plate 18 carrying the second sidewall mold plate 22. The first and second sidewall mold plates 20, 22 thus confine the green tire 36 in axial direction. The first heating plate 26 is then put into place and used to push the actuating ring 14 axially into the direction of the second heating plate 28 and thereby move the tread mold segments 12 radially inwardly. In the first intermediate position, the first heating plate 26 is not at its minimum distance from the second heating plate 28. As a first consequence, the tread mold segments 12 are not at their respective radially innermost positions, i.e., the positions they take when the mold 10 is completely closed. As a second consequence, there exists an axial gap between the first container plate 16 and the first heating plate 26. Nevertheless, in the first intermediate position, the radially inner flange 32 of the intermediate ring 30 already cooperates with the seal 34 on the first container plate so as to create a fluid-tight enclosure including the mold cavity 24.

Application of a vacuum on the mold cavity 24 when the mold 10 is in the first intermediate position is possible and may be effective to draw air from the radial clearance 38. However, air trapped between the first sidewall mold plate 20 and the green tire 36 or between the second sidewall mold plate 22 and the green tire 36 may not be removed efficiently, because the first and second sidewall mold plates 20, 22 firmly seize the green tire 36.

Figure 1:
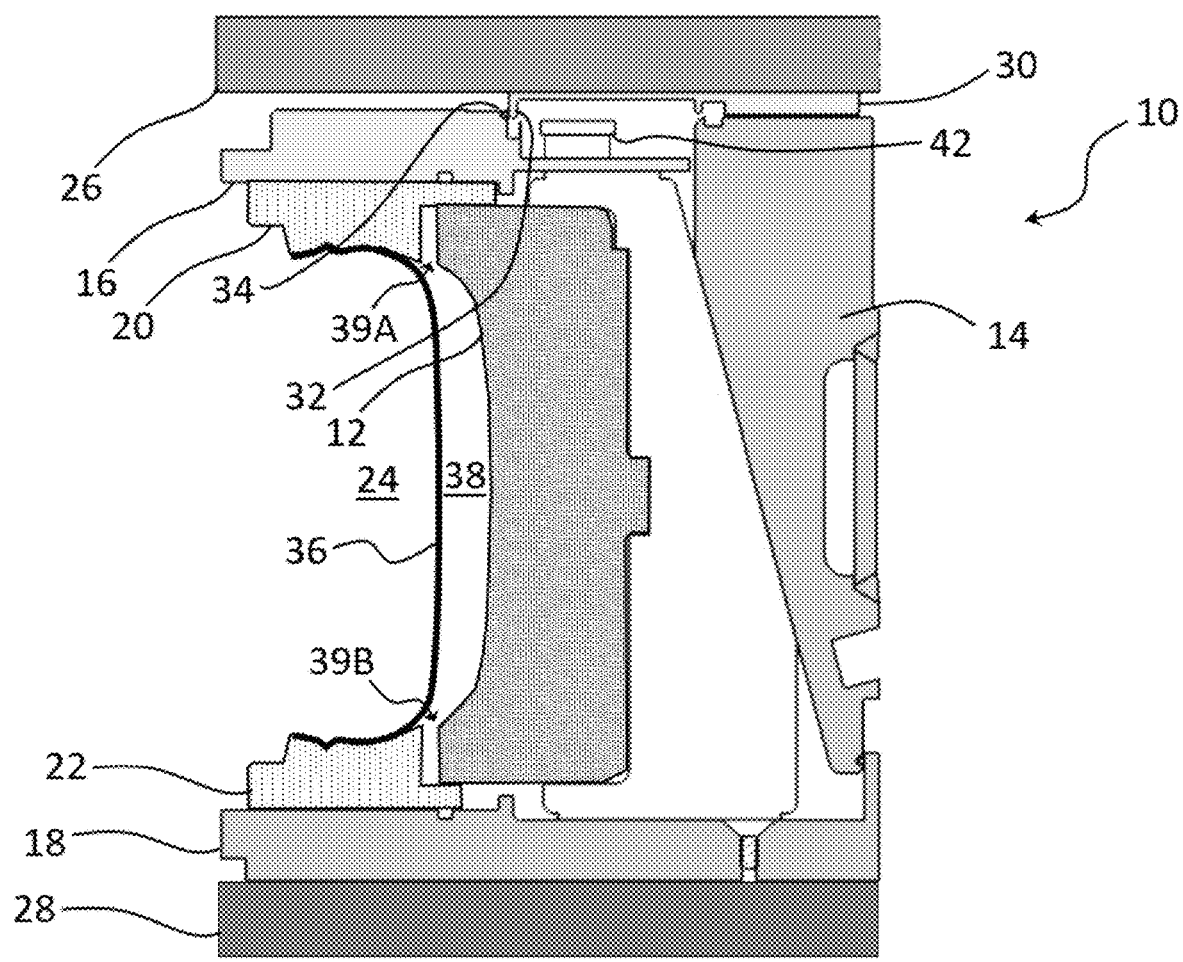
FIG. 1 is a schematic partial cross-sectional view of a tire mold in a first intermediate, partially closed position.
Figure 2:
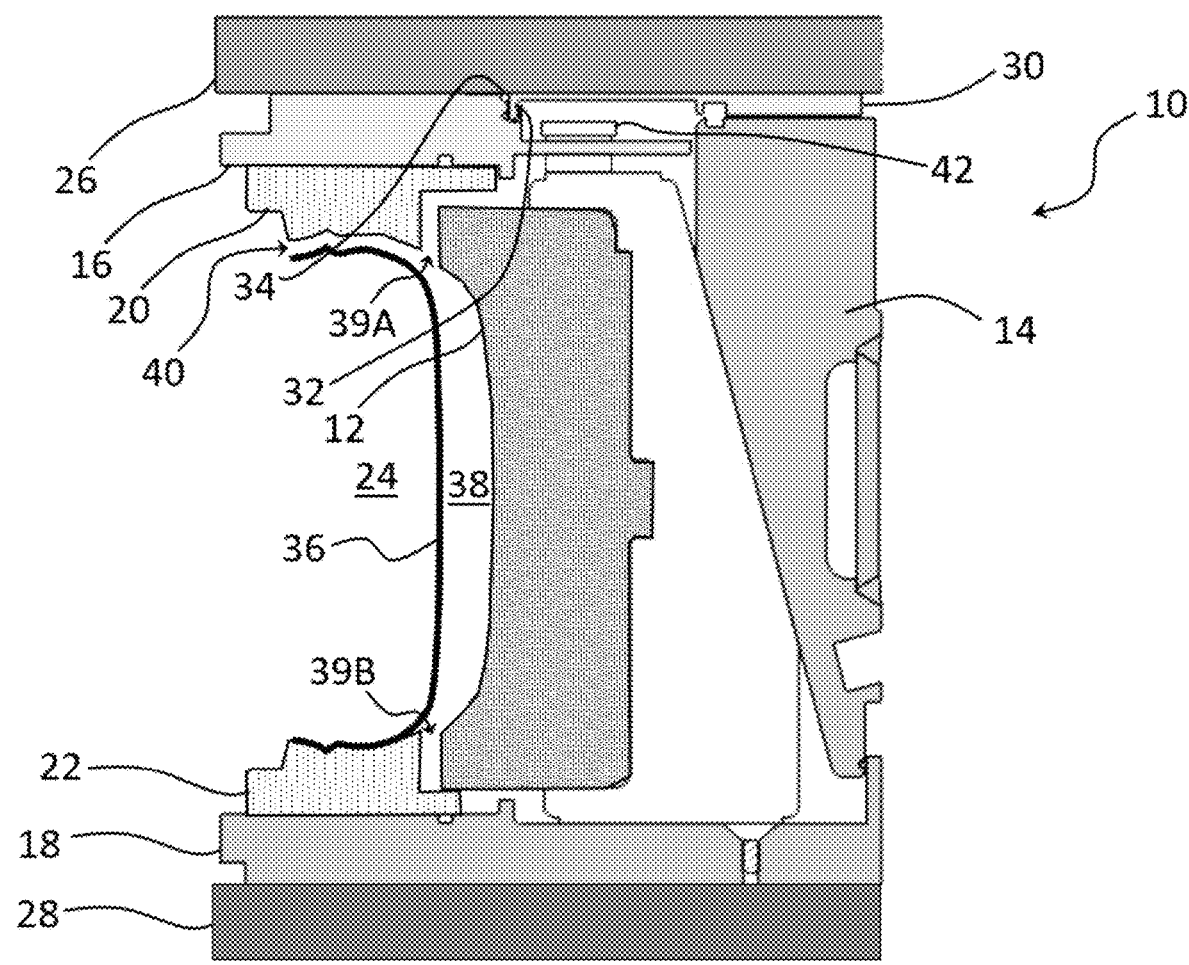
FIG. 2 is a schematic partial cross-sectional view of the tire mold of FIG. 1 in a second intermediate, partially closed position.

To address that issue, the tire mold 10 is brought into a second intermediate position, illustrated in FIG. 2. To arrive from the first intermediate position into the second intermediate position, the first container plate 16 and the first sidewall mold plate 20 fixed to it are moved away from the second container plate 18 and the second sidewall mold plate 22, so that an axial clearance 40 is obtained between the uncured tire 36 and the first sidewall mold plate 20. Concomitantly, the creation of the axial clearance 40 releases axial constraint on the uncured tire 36, which may result in the uncured tire 36 at least partially detaching from the second sidewall mold plate 22. It may be worthwhile noting that during the axial movement of the first container plate 16, the radially inner flange 32 of the intermediate ring 30 continues to cooperate with the seal 34 on the first container plate. The fluid-tight enclosure including the mold cavity 24 is thus preserved.

The tread mold segments 12 are connected slidingly to the first container plate 16 by respective retainer tees 42 fixed on the tread mold segments 12. The first container plate 16 has radial slots, into which the retainer tees 42 are slidingly engaged. The retainer tees and the slots are dimensioned so as to allow for an axial offset between the first sidewall plate 20 and the tread mold segments 12 sufficient for the tire mold 10 to be brought into the second intermediate position. Specifically, the length of the stems of the retainer tees 42 and the thickness of the first container plate 16 around the radial slots are selected in such a way that there is a clearance allowing axial movement of the first container plate 16 carrying the first sidewall mold plate 10 relative to the tread mold segments 12.

Application of a vacuum on the mold cavity 24 when the mold 10 is in the second intermediate position allows withdrawal of air not only from the radial clearance but also from the axial clearance between the green tire 36 and the first sidewall plate 20. When the uncured tire 36 at least partially detaches from the second sidewall mold plate 22, air may also be drawn from the interstice between the uncured tire 36 and the second sidewall plate 22.

Therefore, the process presented herein may be effective for removal of air from the mold cavity. This may alleviate the need for vent holes in the sidewall plates. In certain configurations, the number of vent holes in the sidewall mold plates my thus be drastically reduced. In preferred configurations, vent holes may be completely eliminated from the sidewall mold plates. Accordingly, the processes disclosed herein are preferably carried out with sidewall mold plates comprising a low areal density of vent holes or no vent holes at all.

Figure 3:
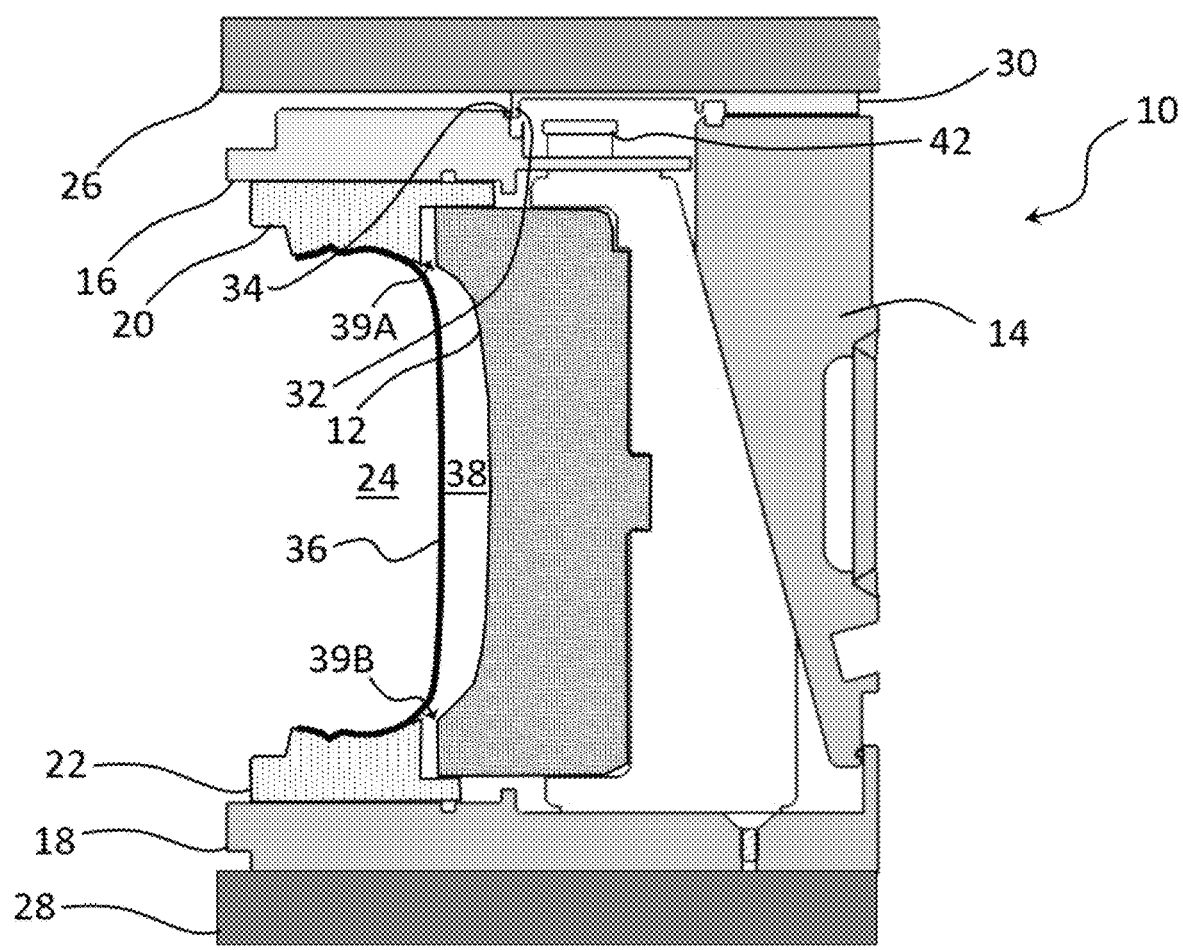
FIG. 3 is a schematic partial cross-sectional view of the tire mold in a further intermediate, partially closed position.

After drawing a vacuum on the mold cavity when the mold 10 is in the second intermediate position, the first container plate 16 and the first sidewall mold plate 20 fixed to it are moved back towards the second container plate 18 and the second sidewall mold plate 22, so that the uncured tire 36 becomes again firmly seized in axial direction (FIG. 3).

While maintaining the mold cavity under vacuum, the mold 10 is then brought into its closed position (FIG. 4) by moving the first heating plate 26 closer to the second heating plate 28, thereby axially moving the actuating ring 14 and thus pushing the tread mold segments 12 radially inwardly. When the mold has been closed, the tire may be cured.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A molding process wherein a tire is molded within a tire mold; the tire mold having movable elements that can be moved to bring the tire mold into an open or into a closed position, the tire mold defining in the closed position a tire mold axis; the tire mold including a first and a second sidewall mold plates and a plurality of tread mold segments cooperating with the sidewall mold plates to form a tire mold cavity, the tread mold segments being movable radially inwardly and outwardly with respect to the tire mold axis; the process comprising:
arranging an uncured tire in the tire mold when the tire mold is in the open position;
bringing the tire mold from the open position into a first intermediate, partially closed, position wherein the plurality of tread mold segments occupy a substantially final axial position but remain separated radially from the uncured tire by a radial clearance;
creating an axial clearance between the uncured tire and at least one of the first and second sidewall mold plates so as to bring the tire mold into a second intermediate, partially closed, position;
drawing a vacuum on the mold cavity while the tire mold is in the second intermediate position;
bringing the tire mold from the second intermediate position into the first intermediate position by axially moving the at least one of the first and second sidewall mold plates; and
moving the tread mold segments radially inwardly and bringing the tire mold into the closed position.

2. The molding process as claimed in claim 1, wherein, in the first intermediate position, the first and second sidewall mold plates are in abutment with the uncured tire.

3. The molding process as claimed in claim 1, wherein, in the first and second intermediate positions of the tire mold, the mold cavity is sealed in an airtight manner.

4. The molding process as claimed in claim 1, wherein the axial clearance between the uncured tire and the at least one of the first and second sidewall mold plates is created by moving the at least one of the first and second sidewall mold plates with a pneumatic or hydraulic actuator.

5. The molding process as claimed in claim 1, wherein the tread mold segments are mounted slidingly to a first container plate carrying the first sidewall mold plate by respective retainer tees fixed to the tread mold segments and slidingly engaged in radial slots arranged on the first container plate and wherein the retainer tees and the slots are dimensioned so as to allow for axial offset between the first sidewall mold plate and the tread mold segments.

6. The molding process as claimed in claim 1, wherein the radial clearance in the first intermediate position of the tire mold amounts to between 3 and 12 mm.

7. The molding process as claimed in claim 1, wherein the axial clearance in the second intermediate position of the tire mold amounts to between 3 and 12 mm.

8. The molding process as claimed in claim 1, wherein the radial clearance in the first intermediate position of the tire mold amounts to between 5 and 10 mm and wherein the axial clearance in the second intermediate position of the tire mold amounts to between 5 and 10 mm.

9. The molding process as claimed in claim 1, wherein the tire mold comprises first and second heating plates adjacent the first and second sidewall mold plates, respectively, wherein the first and second heating plates are a minimum distance apart from each other when the tire mold is in the closed position, wherein the first and second heating plates are spaced apart from each other further than the minimum distance when the tire mold is in the first and second intermediate positions, and wherein the axial clearance between the uncured tire and at least one of the first and second sidewall mold plates is created by axially moving the first sidewall mold plate closer to or into abutment with the first heating plate.

10. The molding process as claimed in claim 1, wherein the axial clearance is created between the uncured tire and the first sidewall mold plate by axially moving the first sidewall mold plate, the creation of the axial clearance releasing axial constraint on the uncured tire such that the uncured tire at least partially detaches from the second sidewall mold plate and air is allowed to be drawn from an interstice between the uncured tire and the second sidewall plate.

11. The molding process as claimed in claim 1, comprising curing the tire when the mold is in the closed position.

12. A method for closing a tire mold for curing rubber-based pneumatic or non-pneumatic tires, the tire mold comprising a first and a second sidewall mold plates and a plurality of tread mold segments cooperating with the sidewall mold plates to form a generally annular tire mold cavity, the tire mold cavity having a tire mold axis; the tread mold segments being movable radially inwardly and outwardly with respect to the tire mold axis, the method comprising: when the tire mold is in an open position, arranging an uncured tire in the tire mold; partially closing the tire mold by bringing the tire mold from the open position into a first intermediate, partially closed, position wherein the plurality of tread mold segments occupy a substantially final axial position while remaining radially separated from the uncured tire by a radial clearance of at least 3 mm; bringing the tire mold into a second intermediate, partially closed, position by creating an axial clearance of at least 3 mm between the uncured tire and at least one of the first and second sidewall mold plates; evacuating gases from the mold cavity by application of a vacuum when the tire mold is in the second intermediate position; while maintaining application of the vacuum, bringing the tire mold from the second intermediate position back into the first intermediate position; and bringing the tire mold into the closed position by moving the tread mold segments radially inwardly.

13. The method as claimed in claim 12, wherein, in the second intermediate position of the tire mold, the mold cavity is sealed in a gastight manner.

14. The method as claimed in claim 12, wherein, in the first intermediate position of the tire mold, the first and second sidewall mold plates axially constrain the uncured tire.

15. The method as claimed in claim 14, wherein the axial clearance is created between the uncured tire and the first sidewall mold plate by axially moving the first sidewall mold plate, the creation of the axial clearance releasing axial constraint on the uncured tire such that the uncured tire at least partially detaches from the second sidewall mold plate and air is allowed to be drawn from an interstice between the uncured tire and the second sidewall plate, by application of the vacuum.

16. The method as claimed in claim 15, wherein the axial clearance between the at least one of the first and second sidewall mold plates is created by moving the at least one of the first and second sidewall mold plates with a pneumatic or hydraulic actuator.

17. The method as claimed in claim 16, wherein the tread mold segments are mechanically coupled to an actuating ring so that the tread mold segments are constrained to move radially when the actuating ring is moved axially, and wherein the tire mold is brought into the closed position by moving the actuating ring in an axial direction causing the tread mold segments to move radially inwardly.

18. The method as claimed in claim 17, wherein the tread mold segments are mounted slidingly to the first sidewall mold plate by respective retainer tees fixed to the tread mold segments and slidingly engaged in radial slots arranged on a first container plate supporting the first sidewall mold plate and wherein the retainer tees and the slots are dimensioned so as to allow for an axial clearance between the first sidewall plate and the tread mold segments sufficient for the tire mold to be brought into the second intermediate position.

19. The method as claimed in claim 18, wherein the tire mold comprises first and second heating plates adjacent the first and second sidewall mold plates, respectively, wherein the first and second heating plates are a minimum distance apart from each other when the tire mold is in the closed position, wherein the first and second heating plates are spaced apart from each other further than the minimum distance when the tire mold is in the first and second intermediate positions, and wherein the axial clearance between the uncured tire and at least one of the first and second sidewall mold plates is created by axially moving the first sidewall mold plate closer to or into abutment with the first heating plate.

20. The molding process as claimed in claim 12, wherein the radial clearance in the first intermediate position of the tire mold amounts to 12 mm or less and wherein the axial clearance in the second intermediate position of the tire mold amounts to 12 mm or less.

\* \* \* \* \*